May 21, 1963

D. HOPPENSTAND 3,090,359

DOUBLE AIR CHAMBER BRAKE CYLINDER

Filed Dec. 5, 1960

INVENTOR.
David Hoppenstand
BY
*J. R. Harris*
his ATTORNEY

INVENTOR.
David Hoppenstand
BY
his ATTORNEY

May 21, 1963 D. HOPPENSTAND 3,090,359
DOUBLE AIR CHAMBER BRAKE CYLINDER
Filed Dec. 5, 1960 3 Sheets-Sheet 3
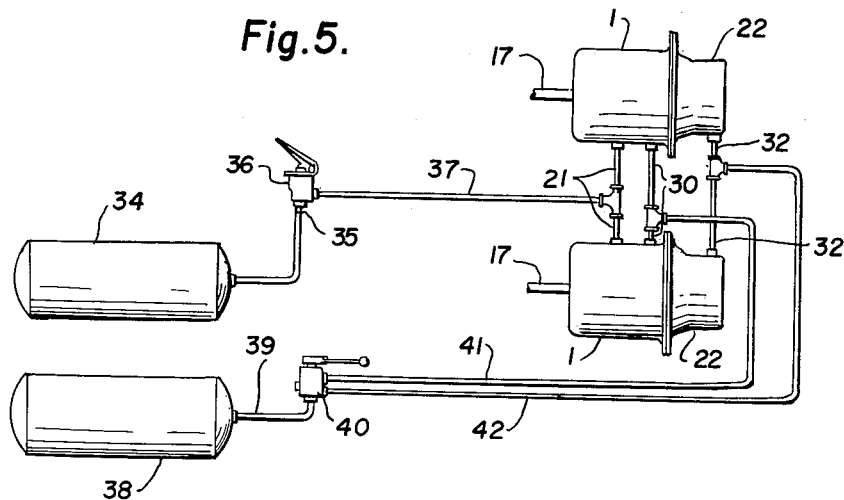
Fig.5.
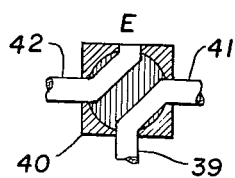
Fig.6ª.
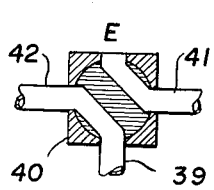
Fig.6ᵇ.
INVENTOR.
David Hoppenstand
BY
his ATTORNEY

United States Patent Office 3,090,359
Patented May 21, 1963

3,090,359
DOUBLE AIR CHAMBER BRAKE CYLINDER
David Hoppenstand, Miami Beach, Fla., assignor to Transport Industries, Inc., Albion, Pa., a corporation of Pennsylvania
Filed Dec. 5, 1960, Ser. No. 73,699
8 Claims. (Cl. 121—38)

This invention relates to motor vehicle braking mechanisms, and is more particularly concerned with a fluid operated brake motor or cylinder having improved safety features.

It is well known to provide motor trucks, buses and the like with power brakes. Those brakes are usually fluid operated and the most commonly used operating fluid is air. My invention will be described hereinafter as an air operated brake motor or cylinder but it is adaptable for use with other operating fluids.

U.S. Patent 2,936,785 issued to Robert M. Hastings on May 17, 1960, discloses a double diaphragm brake cylinder which provides a fluid operated service brake together with a fluid operated emergency or hand brake having additional braking effect. The additional braking effect in that patent is obtained by imparting additional travel to the brake operating rod. It is an object of my invention to provide a brake cylinder having the advantages of the apparatus of the Hastings patent together with the further advantage that the additional braking effect is not impaired by a leakage or rupture of the service brake diaphragm.

It is another object of my invention to provide a double air chamber brake cylinder with positive spring operated emergency braking means effective in the vent of air failure. It is another object to provide such a brake cylinder with positive mechanical means for retracting the spring means. It is another object to provide a double air chamber brake cylinder with emergency braking means which are both spring operated and air operated. Still other objects of my invention will become evident in the course of the following description thereof.

Embodiments of my invention presently preferred by me are illustrated in the attached figures, to which reference is now made:

FIGURE 5 is a piping diagram for the apparatus of FIGURE 4.

FIGURES 6a and 6b show the flow pattern of the four-way valve 40 of FIGURE 5 in its two positions.

Figure 1:
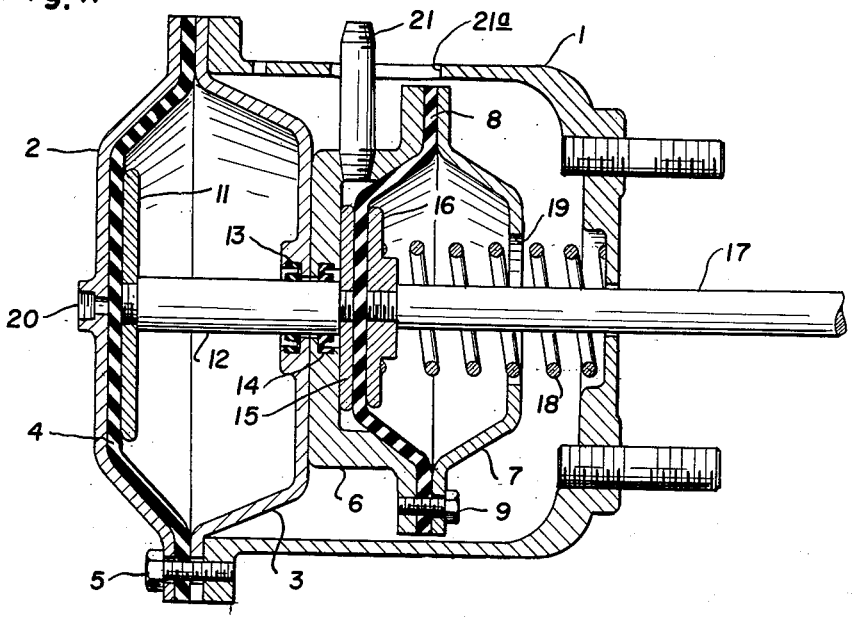
FIGURE 1 is a section through a double air chamber brake cylinder of my invention showng both service and hand brake chambers in the off position.
Figure 2:
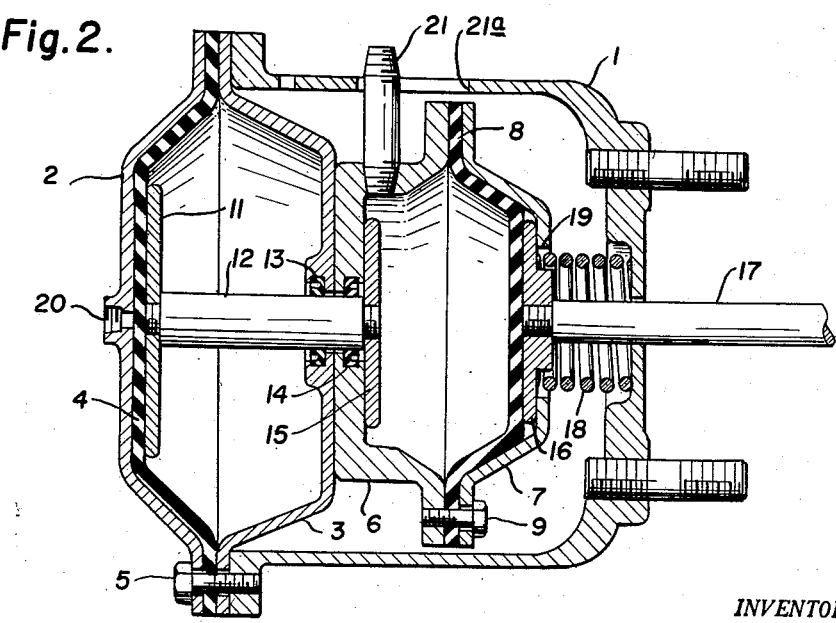
FIGURE 2 illustrates the apparatus of FIGURE 1 with air admitted to the service brake chamber.
Figure 3:
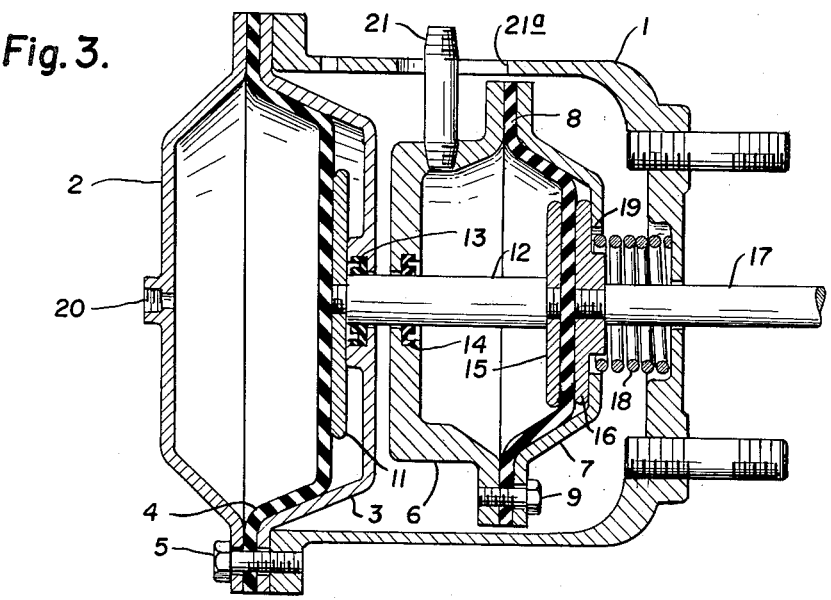
FIGURE 3 illustrates the apparatus of FIGURE 1 with air admitted to the hand brake chamber.

My invention as embodied in FIGURES 1, 2 and 3 hereof is contained within a covering shell 1 which is generally cylindrical in shape and is closed by a dished bottom plate 2. A second dished plate 3 inverted with respect to bottom plate 2 is assembled between shell 1 and bottom plate 2 so as to form with bottom plate 2 a first closed housing or chamber separate from the remaining space within shell 1. A flexible diaphragm 4 is positioned between plates 2 and 3 and that assembly is fastened to shell 1 with screws 5.

Within shell 1 is disposed a generally cup-shaped element 6, the bottom of which is contiguous but not attached to plate 3. A dished plate 7 inverted with respect to cup 6 is assembled with it so as to form a smaller or secondary housing separate from that formed by plates 2 and 3. A flexible diaphragm 8 is positioned between plate 7 and cup 6 and the assembly is fastened together with screws 9.

A push plate 11 is disposed against the face of diaphragm 4 on the same side as plate 3. Plate 11 is attached to one end of push rod 12 which extends through plate 3 and cup 6. Plate 3 is fitted with a sealing ring 13 surrounding push rod 12 so that rod 12 may move with respect to plate 3 without leakage of air therebetween. Cup 6 is fitted with a like sealing ring 14. The other end of push rod 12 is attached to push plate 15 which is positioned between cup 6 and diaphragm 8.

On the other side of diaphragm 8 from push plate 15 is positioned push plate 16, which is attached to one end of brake operating rod 17. The other end of rod 17 extends through plate 7 and the end of shell 1 to connect with the brake shoes, which are not shown. A compressible coil spring 18 is disposed around brake rod 17 between the end of shell 1 and push plate 16. Spring 18 passes through a clearance opening 19 in plate 7.

An air port or inlet 20 is provided in plate 2, and an air pipe 21 in the wall of element 6 projects through a clearance opening 21a in the wall of shell 1. Opening 21a is dimensioned to permit pipe 21 to move in the direction of movement of brake rod 17. Pipe 21 is connected to a source of air under pressure, not shown, through a conventional valve operated by the vehicle foot brake pedal, not shown. Port 20 is likewise connected to a source of air under pressure, not shown, through a conventional valve operated by the vehicle hand brake lever, not shown.

The distance between plates 2 and 3 through which diaphragm 4 can be flexed is greater than the distance between cup 6 and plate 7 through which diaphragm 8 can be flexed.

The operation of the apparatus above described will be understood by reference to FIGURES 1, 2 and 3. As I have mentioned, FIGURE 1 illustrates my apparatus as it appears when neither the foot brake nor the hand brake is applied. When no air under pressure is admitted through either port 20 or pipe 21, diaphragm 8 is forced against push plate 15 by spring 18. Push plate 15 in turn is forced against cup-shaped element 6, and that cup is forced against plate 3. Push plate 11 is likewise forced against diaphragm 4 by push rod 12, and that diaphragm is forced against end plate 2.

When air under pressure is introduced through pipe 21, it causes diaphragm 8 to flex towards plate 7, moving push plate 16 and brake rod 17 to the right in FIGURE 2 and compressing spring 18 between push plate 16 and the end of shell 1. FIGURE 2 shows the position of my apparatus with full air pressure behind diaphragm 8. The travel of brake rod 17 in the position there shown is sufficient to apply the wheel brakes fully.

It is well known, however, that brakes wear, and "fade" when subjected to prolonged overload. My apparatus is designed to provide effective braking even under those conditions, in a manner now to be described. When air under pressure is admitted to port 20, by operation of the hand brake lever previously mentioned, diaphragm 4 is flexed toward plate 3. That movement of diaphragm 4 moves push plate 11 and push rod 12 attached thereto towards the right in FIGURE 2. Push plate 15 carried by push rod 12 is also moved in the same direction, and if sufficient air is admitted through port 20, diaphragm 4 is flexed until push plate 15 comes up against diaphragm 8. If the full air pressure has previously been applied to diaphragm 8, it will be flexed against plate 7 as is shown in FIGURE 2, and push plate 15 cannot move it further in the same direction without moving the entire secondary housing comprising cup 6 and plate 7, and this is what it does. The position of my apparatus with full air pressure behind diaphragm 4 is shown in FIGURE 3. It will be noted that cup 6 has been moved away from plate 3 a distance equal to the difference between the maximum displacement of diaphragm 4 and the maximum displacement of diaphragm 8. The extra travel thus imparted to brake operating rod 17 counteracts brake wear and brake "fading" and makes possible effective braking in all circumstances.

The apparatus of my invention will be effective even though the air line to pipe 21 breaks, or the service brake diaphragm 8 ruptures. When full air pressure is admitted behind diaphragm 4 it is moved into the position shown in FIGURE 3 and push rod 12, through push plates 11 and 15, imparts the same movement to diaphragm 8, whether or not there is any air pressure behind it.

Figure 4:
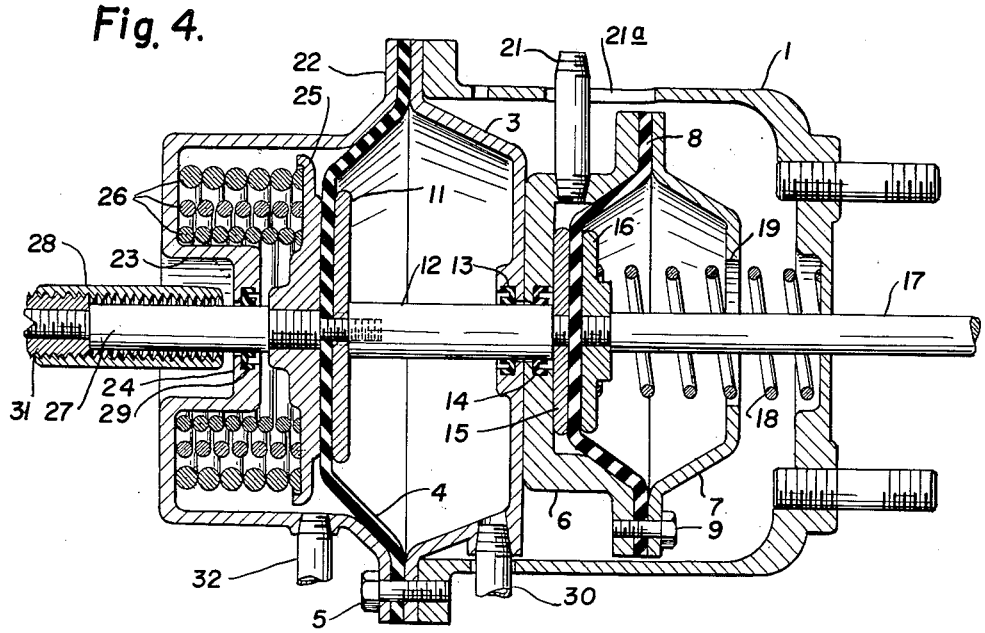
FIGURE 4 is a section through another embodiment of my invention including service and hand brake air chambers together with a spring brake chamber.

FIGURE 4 illustrates another embodiment of my invention in which the apparatus above described is modified by the addition of a spring mechanism to provide automatic emergency braking in the event of a total failure of air pressure. Elements that are common to the embodiments of FIGURE 4 and FIGURES 1, 2 and 3 are identified by the same reference characters in all figures.

In the embodiment of FIGURE 4 bottom plate 2 previously described is replaced by bottom cover 22 which is cylindrical in shape. The closed end of cover 22 is formed with a centrally located cylindrical indented or depressed portion 23 having a flat bottom or end 24. A stud 27 passes through a clearance opening in end 24, which is provided with a sealing ring 29 similar to sealing rings 13 and 14 previously described. The inner end of stud 27 is attached to a push plate 25 positioned between diaphragm 4 and end 24 of bottom cover 22. A continuation of the inner end of stud 27 passes through diaphragm 4 and is attached to push plate 11 and push rod 12 previously described. Nested compression coil springs 26—26 are positioned in the annular channel formed by the end of bottom cover 22 and its indented portion 23, between the bottom of that channel and push plate 25. A threaded nut 28 mating with threaded end 31 of stud 27 is provided for a purpose to be described. An air inlet pipe 30 is provided in plate 3. An air inlet pipe 32 is provide in cover 22.

The service brake portion of the embodiment of my FIGURE 4 operates in the same manner as the service brake portion of the embodiments of my FIGURES 1, 2 and 3, and requires no further description.

The operation of my apparatus shown in FIGURE 4 will be described first with air inlet pipe 32 shut off. Compression coil springs 26—26 urge brake rod 17, through push rod 12 and push plates 11 and 15, towards the right in FIGURE 4. In the absence of any countervailing force, therefore, springs 26—26 apply the brakes to a vehicle equipped with my apparatus. When air under pressure is admitted through air inlet pipe 30 into the closed housing formed by cover 22 and plate 3, it flexes diaphragm 4 toward the left in FIGURE 4, and my apparatus assumes the position shown in FIGURE 4. Under normal running conditions full air pressure is applied against springs 26—26 so that they are compressed. The hand brake is applied by cutting off air from pipe 30 and allowing that pipe to exhaust to the atmosphere. Springs 26—26 are thus permitted to move diaphragm 4 and all other elements of my apparatus moved thereby, in the way previously described herein.

Maximum safety is obtained when my apparatus is operated with both inlet pipes 30 and 32 connected to a source of air under pressure in the way shown in FIGURE 5. Air reservoir 34 is connected through pipe 35, foot control valve 36 and pipe 37 to air inlet pipe 21. Air reservoir 38 is connected through pipe 39 to a conventional four-way valve 40 which is hand operated. One port of valve 40 is connected through pipe 41 to air inlet pipe 30, while the other port of valve 40 is connected through pipe 42 to air inlet pipe 32. The flow pattern through valve 40 in its two positions is shown by FIGURES 6a and 6b. In FIGURE 6a pipe 41 is connected to pipe 39 and pipe 42 is opened to the atmosphere through exhaust port E. In FIGURE 6b pipe 42 is connected to pipe 39 and pipe 41 is opened to the atmosphere.

When the hand valve 40 is in the position shown in FIGURE 6a, air under pressure from reservoir 38 is admitted through inlet pipe 30 between diaphragm 4 and dished plate 3, so as to move diaphragm 4 to the left in FIGURE 4 and compress springs 26—26. At the same time air inlet pipe 32 is open to the atmosphere so that there is no air pressure between diaphragm 4 and cover 22. Under these conditions the vehicle is braked by the service brake, operated by foot control valve 36.

When emergency braking becomes necessary valve 40 is turned to the position shown in FIGURE 6b. Air under pressure from reservoir 38 is admitted through air inlet pipe 32 between diaphragm 4 and cover 22, thus assisting springs 26—26 to apply the brakes. At the same time air inlet pipe 30 is open to the atmosphere, releasing the air pressure opposing springs 26—26. The brakes will be operated by the air pressure between diaphragm 4 and cover 22 even though springs 26—26 break, and, as has been mentioned, the brakes will be operated by springs 26—26 even though diaphragm 4 ruptures or the air pressure fails.

Nut 28 normally is not screwed on stud 27. If it is necessary to release the brakes without the use of air pressure nut 28 is screwed on thread 31 of stud 27 against bottom face 24 of bottom housing 22. This causes push plate 25 to be drawn to the left in FIGURE 4, together with all elements of my apparatus attached thereto.

I claim:

1. A break-actuating fluid-operated motor comprising a first housing closed at both ends, a first diaphragm disposed across the first housing intermediate its ends, a second housing closed at one end positioned with its closed end adjacent to an end of the first housing, the first and second housings being movable with respect to each other, a second diaphragm disposed across the second housing intermediate its ends, a first push plate disposed against the first diaphragm, a push rod attached at one end to the first push plate and extending through the adjacent ends of the first and second housings, a second push plate attached to the push rod at its other end and positioned between the closed end of the second housing and the second diaphragm, a third push plate disposed against the other side of the second diaphragm, a brake operating rod attached to the third push plate, means for introducing fluid under pressure into the second housing only so as to flex the second diaphragm and thereby move the brake operating rod, and means for introducing fluid under pressure into the first housing only so as to flex the first diaphragm and thereby move the push rod.

2. Apparatus of claim 1 including a fourth push plate disposed against the first diaphragm on the other side from the first push plate and compressible spring means disposed between the fourth push plate and the end of the first housing.

3. Apparatus of claim 2 in which the central portion of the end of the first housing projects inwardly to form a depression in the first housing, and the fourth push plate is provided with a stud projecting through the depression and having a threaded outer end and a mating nut longer than the depression.

4. Apparatus of claim 1 in which the second housing is provided with stop means positioned to limit the movement imparted to the brake operating rod by the second diaphragm to an amount less than that imparted to the push rod by the first diaphragm.

5. Apparatus of claim 1 including a thrid housing attached to the first housing and enclosing the second housing, and compressible spring means disposed between the third push plate and the end of the third housing.

6. Aparatus of claim 2 in which the means for introducing fluid under pressure into the first housing includes a port opening into the first housing on the first push plate side of the first diaphragm.

7. A brake-actuating fluid-operated motor comprising a first housing closed at both ends, a first diaphragm disposed across the first housing intermediate its ends, a second housing closed at one end positioned with its closed end adjacent to an end of the first housing, the first and second housings being moveable with respect to each other, a second diaphragm disposed across the second housing intermediate its ends, a first push plate disposed against the first diaphragm, a push rod attached at one end to the first push plate and extending through the adjacent ends of the first and second housings, a second push plate attached to the push rod at its other end and positioned between the closed end of the second housing and the second diaphragm, a third push plate disposed against the other side of the second diaphragm, a brake operating rod attached to the third push plate, a fourth push plate disposed against the first diaphragm on the other side from the first push plate, compressible spring means disposed between the fourth push plate and the end of the first housing, first means for introducing fluid under pressure into the second housing between its closed end and the second diaphragm, second means for introducing fluid under pressure into the first housing on the first push plate side of the first diaphragm, and third means for introducing fluid under pressure into the first housing on the fourth push plate side of the first diaphragm.

8. Apparatus of claim 7 in which the second and third means for introducing fluid under pressure are supplied from a common source of fluid under pressure and are connected thereto through a four-way valve.

References Cited in the file of this patent
UNITED STATES PATENTS

| 2,754,805 | Beman | July 17, 1956 |
| 2,962,000 | Alfieri | Nov. 29, 1960 |

FOREIGN PATENTS

| 522,107 | Germany | Apr. 4, 1931 |